US008122100B2

(12) United States Patent
Raciborski et al.

(10) Patent No.: US 8,122,100 B2
(45) Date of Patent: Feb. 21, 2012

(54) MULTIPLE OBJECT DOWNLOAD

(75) Inventors: Nathan F. Raciborski, Phoenix, AZ (US); Mark R. Thompson, Chandler, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 958 days.

(21) Appl. No.: 10/901,893

(22) Filed: Jul. 28, 2004

(65) Prior Publication Data

US 2005/0132083 A1   Jun. 16, 2005

Related U.S. Application Data

(60) Provisional application No. 60/508,626, filed on Oct. 3, 2003, provisional application No. 60/500,388, filed on Sep. 5, 2003, provisional application No. 60/490,810, filed on Jul. 28, 2003.

(51) Int. Cl.
*G06F 15/16* (2006.01)
(52) U.S. Cl. ........................................ 709/218
(58) Field of Classification Search ............... 709/218
See application file for complete search history.

(56) References Cited

U.S. PATENT DOCUMENTS

| | | | |
|---|---|---|---|
| 6,237,006 B1 * | 5/2001 | Weinberg et al. | 707/797 |
| 6,289,012 B1 | 9/2001 | Harrington | |
| 6,427,140 B1 * | 7/2002 | Ginter et al. | 705/80 |
| 6,675,212 B1 | 1/2004 | Greenwood | |
| 6,950,804 B2 | 9/2005 | Strietzel | |
| 6,990,630 B2 | 1/2006 | Landsman et al. | |
| 7,149,958 B2 | 12/2006 | Landsman et al. | |
| 7,254,622 B2 | 8/2007 | Nomura et al. | |
| 7,316,033 B2 | 1/2008 | Risan et al. | |
| 7,363,499 B2 * | 4/2008 | Perlman | 713/176 |
| 2001/0051996 A1 * | 12/2001 | Cooper et al. | 709/217 |
| 2002/0052957 A1 | 5/2002 | Shimada | |
| 2002/0077985 A1 * | 6/2002 | Kobata et al. | 705/51 |
| 2003/0014630 A1 * | 1/2003 | Spencer et al. | 713/168 |

(Continued)

FOREIGN PATENT DOCUMENTS

WO    WO 01/11466 A    2/2001

(Continued)

OTHER PUBLICATIONS

Cherry, S.M., "Making music pay [digital music distribution]", Spectrum, IEEE vol. 38, Issue 10, Oct. 2001 pp. 41-46.*

(Continued)

*Primary Examiner* — Vivek Srivastava
*Assistant Examiner* — William Goodchild
(74) *Attorney, Agent, or Firm* — Kilpatrick Townsend & Stockton LLP

(57) ABSTRACT

According to the invention, a system for downloading a plurality of content objects from the Internet to a computer of a user is disclosed. The system includes first and second web pages, a database and a media server. The first web page allows selection of the number of content objects. The second web page includes a link to an application that includes embedded information that correlates the number of content objects to the application. The database stores the number of content objects. The media server composes an application that includes the embedded information. The number of content objects are selected by a user from the first web page. The media server allows download of the number of content objects after receiving the embedded information from a computer of a user.

19 Claims, 10 Drawing Sheets

U.S. PATENT DOCUMENTS

| | | | |
|---|---|---|---|
| 2003/0105835 A1* | 6/2003 | Hori et al. | 709/219 |
| 2003/0195974 A1 | 10/2003 | Ronning et al. | |
| 2004/0019497 A1 | 1/2004 | Volk et al. | |
| 2004/0024688 A1* | 2/2004 | Bi et al. | 705/37 |
| 2004/0064573 A1 | 4/2004 | Leaning et al. | |
| 2004/0254958 A1 | 12/2004 | Volk | |

FOREIGN PATENT DOCUMENTS

| | | | |
|---|---|---|---|
| WO | WO 0111466 A2 * | 2/2001 | |

OTHER PUBLICATIONS

Waller et al., "Securing the delivery of digital content over the Internet", Electronics & Communication Engineering Journal vol. 14, Issue 5, Oct. 2002 pp. 239-248.*

Open Mobile Alliance, Generic Content Download over the Air Specification, Version 1.0 (Announcement Open Mobile Alliance), Jun. 20, 2002, pp. 1-40, XP002264099.

* cited by examiner

MULTIPLE OBJECT DOWNLOAD

This application claims the benefit of and is non-provisional of U.S. application Ser. No. 60/490,810 filed on Jul. 28, 2003, U.S. application Ser. No. 60/500,388 filed on Sep. 5, 2003 and U.S. application Ser. No. 60/508,626 filed on Oct. 2, 2003, which are all incorporated by reference in their entireties.

This application is related to U.S. patent application Ser. No. 10/901,907, filed on the same date as the present application, entitled "CONSISTENT BROWSER FILE DOWNLOAD,", which is incorporated by reference in its entirety.

BACKGROUND OF THE DISCLOSURE

This disclosure relates in general to content download and, more specifically, but not by way of limitation, to downloading multiple content objects from a network.

There is no way to easily download multiple content objects today. An example of the problem is demonstrated at a music download web site that is forcing people to individually click on each object to save the object to their local drive. For a complete album, that could be around 14 individual downloads for each song, for example.

Other attempted solutions to this problem are generally limited to creating a client application for downloading groups of files. The client application, which is not tailored for each group of files, is initiated during a download of a file having a group of objects by prompting the operating system for the application with a unique file extension associated in the operating system with the client application. This method requires defining a unique file extension to the operating system so the associated client application is retrieved when that file extension is encountered. Trying to get users to install and upgrade the client application is cumbersome. To download the files on another computer, the application and other configuration must be performed for that computer also.

Another technique for solving the problem of multiple file download creates a single compressed file that includes the various files for download. One example of this technique is the creation of a zip compressed file that encapsulates multiple files. The zip file is often very large and ultimately has to be unzipped by the user, which can be a complex process.

BRIEF DESCRIPTION OF THE DRAWINGS

The present disclosure is described in conjunction with the appended figures.

Figure 1:
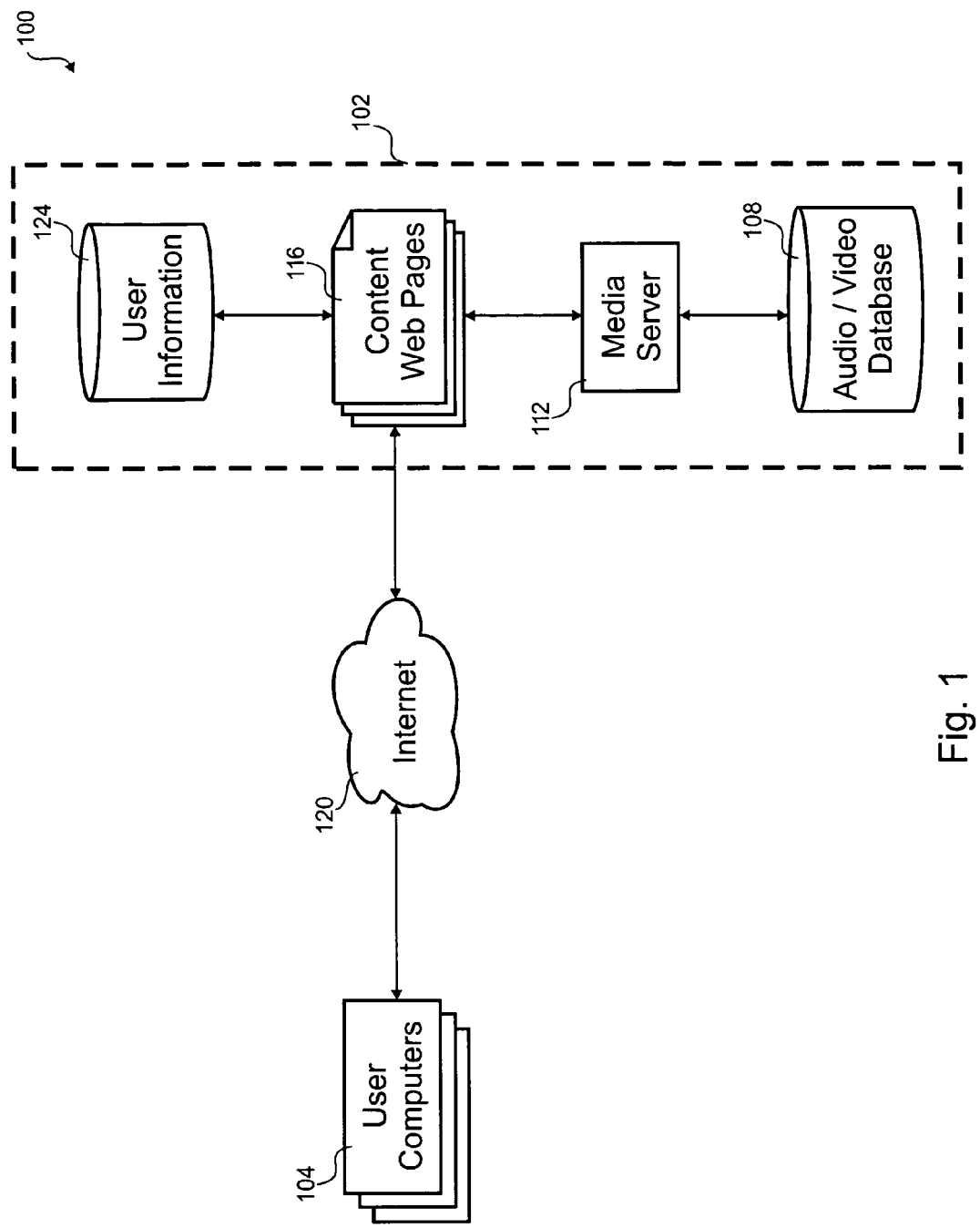
FIG. 1 is a block diagram of an embodiment of a media delivery system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine readable medium" includes, but is not limited to, portable or fixed storage devices, optical storage devices and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In one embodiment, the present invention is designed to easily support multiple object downloads with one click in the browser. In addition, the invention makes downloading or simply streaming content more intuitive for end-users, enhancing online experiences and driving return visits. Whether requested items are music, software, games, or movies, the present invention gives content providers the ability to support easy distribution and organization of the media their customers demand.

Complete albums, song tracks, episodes, software updates or other content that is grouped in files can be easily downloaded with minimal end-user training. An end-user can conveniently download all the items they want in a single session. The invention has no dependencies or plug-in requirements in one embodiment, making it easy to customize and deploy for any media company looking to launch or enhance their media download services. Some embodiments do, however, include a browser plug-in to process the data in ways specific to the media company.

In one embodiment, the present invention provides the ability to download multiple objects at one time in an improved manner. The invention dynamically creates a content group program unique to the user, transaction session identifier and/or the group of objects. Execution of the content group program downloads a specific list of objects associated with the transaction session identifier. As part of the download process, the content group program identifies the user and/or purchase to the origin server and identifies the objects to download. A certificate or token could be embedded in the content group program to allow authentication of the content group program by providing the certificate to the origin server. The user can pass the dynamically and specifically created program to another account or computer and re-execute it. On the other computer, the program will initiate the downloads to the present computer.

In another embodiment, the content group program includes a transaction session identifier. The origin server or related server can retrieve other information using the unique transaction session identifier. For example, a list of objects to download and a user identifier are retrieved by the origin server using the transaction session identifier. Once the list of objects are known and the download is authorized, the download of the objects is initiated in a serial or parallel fashion.

The content group program is an executable program that initiates the download of specified objects from a network when initiated. In this embodiment, the content group program is about 150 KB in size, but could be other sizes in other embodiments. There could be various versions of the content group program to allow execution on various software platforms, or a version could be cross-platform compatible to execute on a number of software platforms. Each content group program is unique to a particular transaction session. Once the user selects the objects for download, the content program group is generated for that transaction session. A button on the web page corresponds to the content group program. A right-click on the button, for example, initiates download of the content group program to a specified location using the HTTP download function of the web browser. The user can run the content group program immediately after download or at any later time.

Execution of the content group program causes download of the objects to any path specified by the user. The content group program has an interface that: shows the objects being download, allows selection of a subset of the objects in the predefined group, allows interruption of the download of all or some objects, allows adding additional objects to the download, provides status information on the downloads, provides usage information for any DRM of the objects, etc. Only the single content program is required to initiate download of the objects on any computer. This allows sending this file in e-mail to any recipient. The recipient doesn't need to install the content group program, but only has to execute the program to download the objects to any specified path.

Generally, the content group program has two components in this embodiment, more specifically, a program portion and a payload portion. The program portion is generic to any payload portion. In this embodiment, the program portion is tamper proof so as to avoid any unauthorized modifications. The payload portion could also be made tamper proof.

Customization of the content group program is contained within the payload portion. This embodiment includes XML data in the payload portion to somehow indicate the group of objects for download, among other things. Other embodiments could use other techniques to store information in the payload portion. In one embodiment, the payload portion includes the transaction session identifier, a user identifier, a number of URIs for the objects, a description for each object, and configuration information. The operator of the origin server uses the configuration information to affect how the content group program behaves. For example, the operator may limit download bandwidth, may specify how many objects should be simultaneously downloaded, may specify alternative paths for the objects, specify display properties, specify DRM limitations, etc. Instead of including information in the payload portion, the payload could specify the transaction session identifier and a remote database could retrieve any other information associated with that transaction session identifier.

Building the content group program is not resource intensive. The program portion along with any configuration information is retrieved for the operator. The remaining XML data is compiled for the transaction session. A concatenation is performed for the program and payload portions. This may include compiling the concatenated portions or not. The file name for the content group program is formulated. In this embodiment, a date code is used to create the file name. The file name could include other information also.

In one embodiment, there is no payload portion. The content group program is identical, but the file name is customized with a token that uniquely identifies the transaction session. Execution of the content group program forwards the token to the origin server operator for retrieval of the other information used to download the objects associated with the content group program. Some embodiments could use tool tip information to store the token. Further, the tool tip information could store data on the objects to help identify what the content group program corresponds to.

Referring initially to FIG. 1, a block diagram of an embodiment of a media delivery system 100 is shown. Any number of user computers 104 connect to a media site 102 to download one or more content objects over the Internet 120 or some other wide area network. In this embodiment, the content objects are video files and/or audio files, but other embodiments could include any type of files (e.g., software, text, animation, etc.).

The media site 102 serves the content objects to the various user computers 104. The media site 102 can have various configurations, but this embodiment includes content web pages 116, a media server 112, an audio and/or video database 108, and a user information database 124. Some embodiments may use content delivery networks to further enhance delivery.

The media server 112 formulates the web pages 116 with forms, links and other information to sign-up users, gather information on the users, allow ordering of content, allow linking to the content, bill the users for content, etc. Information about the user and the content they have ordered is stored in the user information database 124. The available content is stored in the audio and/or video database 108. The media server 108 formulates the web pages 116 and processes the content to ease download to the users. For content previously purchased, the media server 112 can allow later download by checking authorization in the user information database 124 for the rights to the previously purchased content.

Figure 2A:
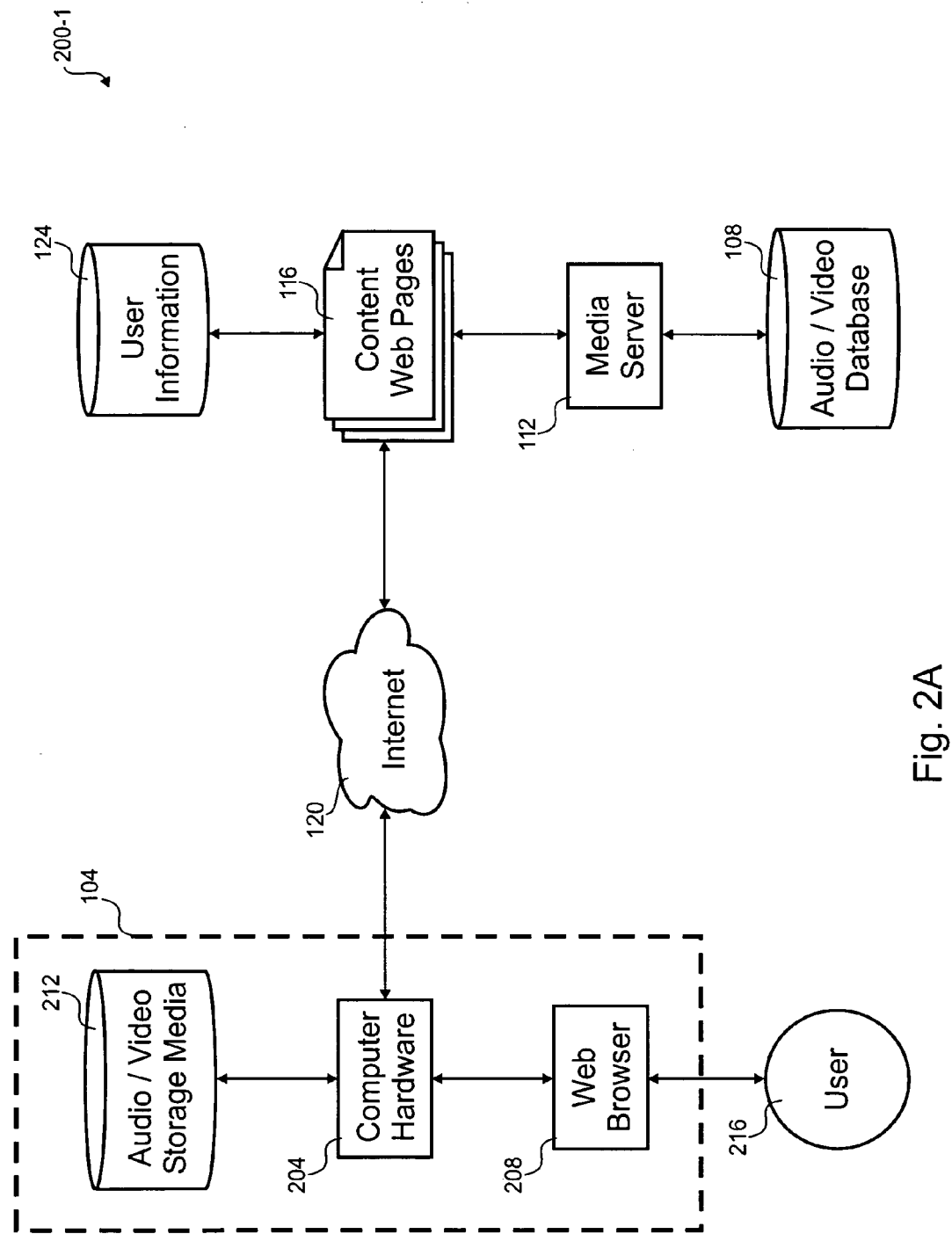
FIGS. 2A and 2B are block diagrams of embodiments of a single user interacting with the media delivery system.

With reference to FIG. 2A, a block diagram of an embodiment of a single user 216 interacting with the media delivery system 100 is shown. In this embodiment, the user computer 104 is a personal computer, but it could be a PDA, cellular phone, gaming device, personal video recorder, or portable media player in other embodiments. The user computer 104 includes a web browser application 208 that interfaces with computer hardware 204 that runs the software, stores information and communicates with the Internet 120. Content objects downloaded from the media site 102 are stored in an audio and/or video storage media 212, for example, a hard drive, flash memory, network attached storage, etc.

Figure 2B:
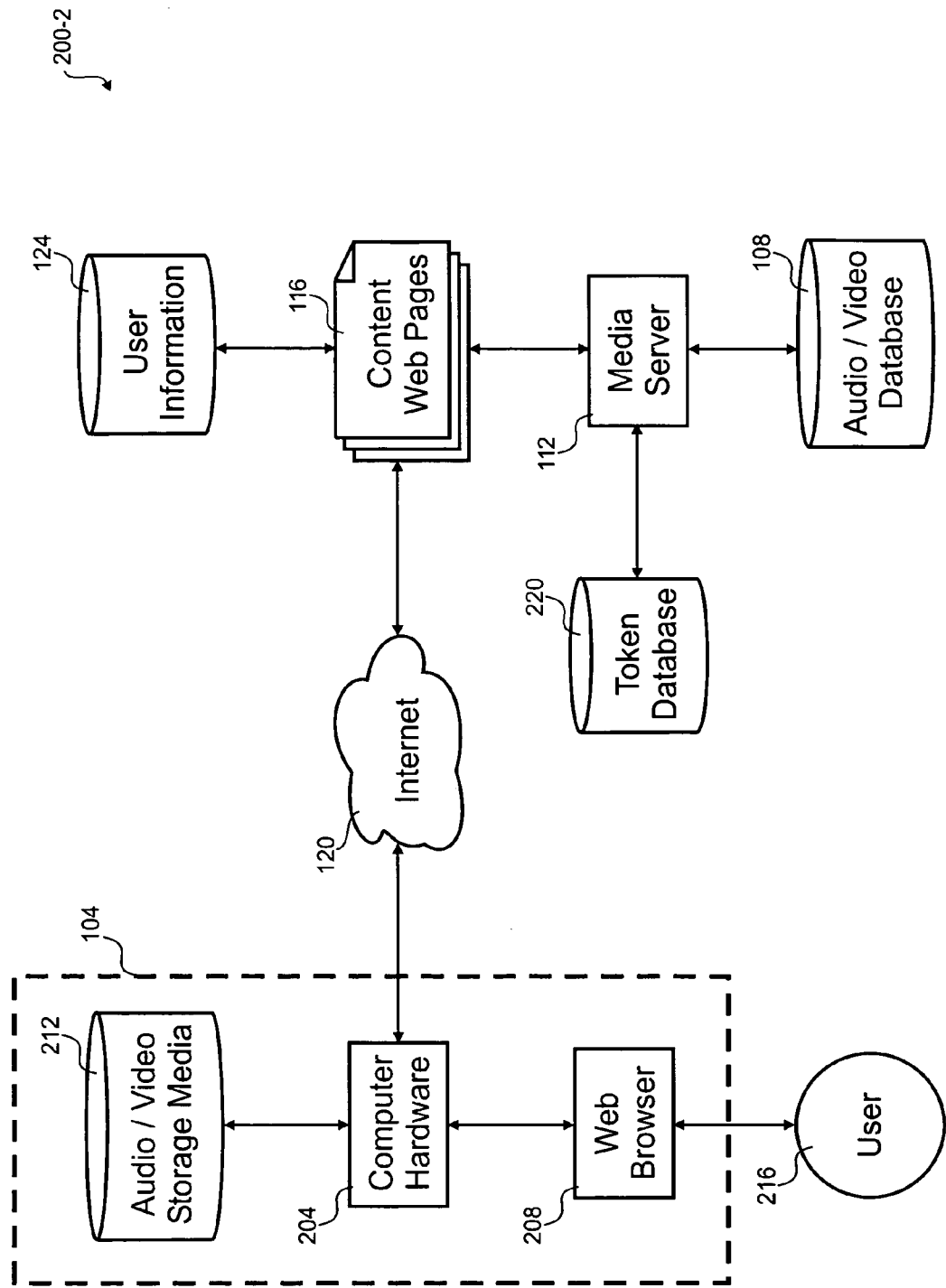

Referring next to FIG. 2B, a block diagram of another embodiment of the single user 216 interacting with the media delivery system 100 is shown. This embodiment of the media site includes a token database 220. As download manager programs are produced, a token can be embedded in the program. When the program is executed, the token is provided to the media site 102 for referencing the token database. Associated with the token is customized XML that indicates information related to the particular download manager program. This information includes the content object descriptions, and possibly other information such as the user owning or licensing the content objects, the number of times downloaded, version of the content objects, size of the content objects, any digital rights management (DRM) rules, etc.

Figure 3C:
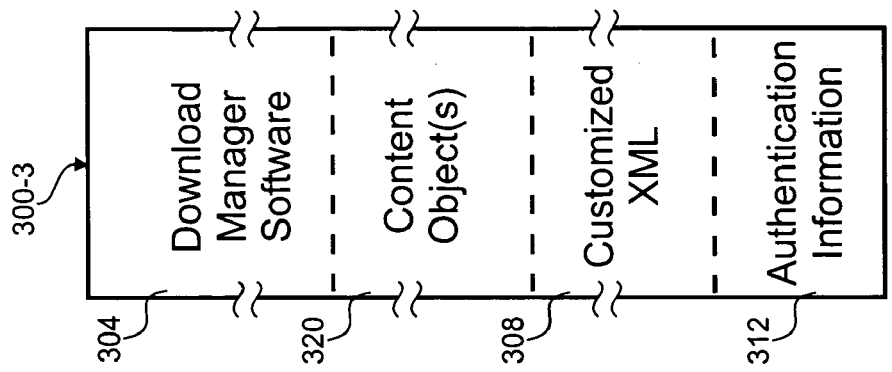
FIGS. 3A, 3B and 3C are block diagrams of embodiments of a download manager program.
Figure 3B:
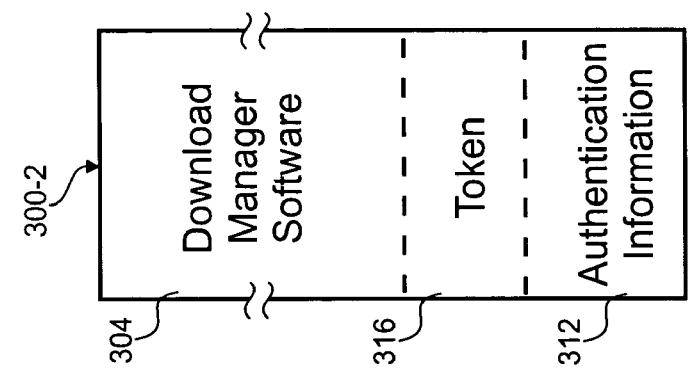
Figure 3A:
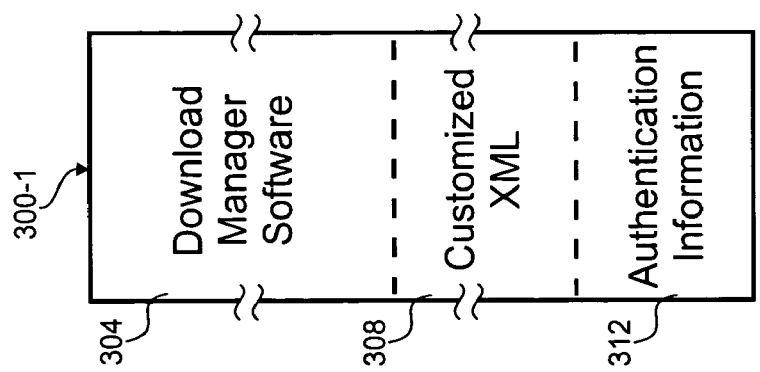

With reference to FIG. 3A, a block diagram of an embodiment of a download manager program 300-1 is shown that has customized XML 308 embedded within it. The customized XML 308 describes the content objects associated with the download manager program 300-1. The files listed in the customized XML 308 are requested from the media site 102 by the download manager software 304 and downloaded. Each download manager program 300-1 is compiled after the content objects are requested such that each one is unique. The download manager software portion 304 of the program 300 can be pre-compiled to speed addition of the customized XML 308 and authentication information 312 after request of the content objects. There can be different embodiments of the download manager software 304 to support various computing platforms or one version can work across platforms.

Some embodiments may encrypt the customized XML in a key known only to the media site. When the customized XML is presented later to the media site, the customized XML can be decrypted to determine the content objects being requested. Also, successful decryption authenticates the information in the customized XML. In one embodiment, the customized XML includes the content object descriptions, and possibly other information such as the user owning or licensing the content objects, the number of times downloaded, version of the content objects, size of the content objects, any digital rights management (DRM) rules, etc.

Authentication information 312 embedded in the download manager program 300-1 can be used by the download manager software 304 to authenticate the customized XML 308 and download manager software 304. Any tampering or modification could be found by the download manager in this manner. The authentication information 312 could be a CRC, signature or hash of customized XML 308 and download manager software 304. In another embodiment, the authentication information is only generated over the customized XML 308. The authentication information 312 could be presented to the media site 102 for checking before allowing download of the content objects. The various authentication information packets 312 for the download manager programs of each user could be stored in the user information database 124.

The user can execute the download manger program 300 after download. The program 300 retrieves the content files once executed, if any authentication of the program 300 is performed by the program 300 itself and/or the media site 102. The download manager 300 in various embodiments can support multiple file download, password protection, streaming download, playing vignettes during download, decompressing files, secure sockets layer, download resume, error checking, selecting some or all content files for download, choosing destination file path, requesting files in different encoding formats and bit rates, etc.

The download manager program 300 is transportable in some embodiments to other computers. Executing the program on another machine would download the files to that computer if permitted. In some cases, the download manager program 300 can authenticate the user with a password. Other embodiments, will not download the content objects after the content objects are downloaded a certain number of time. In one embodiment, the content objects can be downloaded for a period of time before subsequent execution will not download the content objects. The time on the user computer 104 could be used or a time reference at the media site could be used or a time standards site on the web. The download manager program 300 can work in conjunction with the media site 102 to perform these functions.

Referring next to FIG. 3B, a block diagram of another embodiment of the download manager program 300-2 is shown that has a token 316 embedded within it. The token 316 is presented to the media site 102 that references the token database 220 to provide XML information back to the download manager program 300-2. In one embodiment, the XML is not passed back to the download manager program 300-2 and the media site controls passing the content objects to the download manager program 300-2. The token 316 uniquely identifies download manager program 300-2. The authentication information 312 can be used to authenticate the token 316. In some embodiments, the token 316 is encrypted in the program 300-2, but can be decrypted by the media site 102. In one embodiment, the token is embedded in the file name of the program 300-2 or file information metadata.

With reference to FIG. 3C, a block diagram of another embodiment of the download manager program 300-3 is shown that embeds at least a portion of the content objects 320 into the program 300-3. Before extraction, the media site 102 has to authorize the extraction. The media site may require a password or authentication of the user computer 104 before the files can be extracted.

Figure 4A:
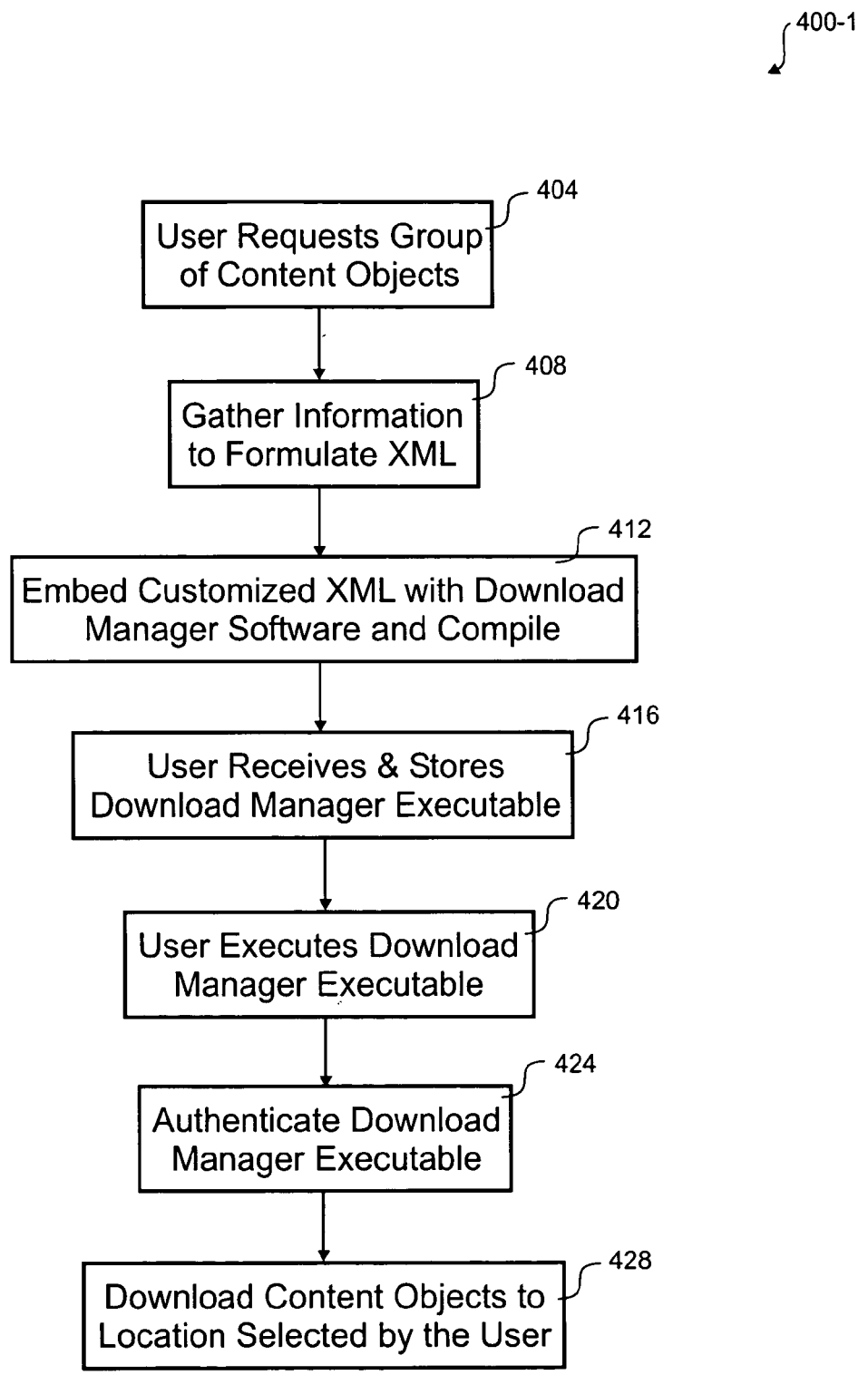
FIGS. 4A, 4B, 4C, 4D, 4E, and 4F are flow diagrams of embodiments of processes that each download multiple content files.

With reference to FIG. 4A, a flow diagram of an embodiment of a process 400-1 for downloading multiple content files is shown. The depicted portion of the process 400-1 begins in step 404 where the user 216 requests a group of content objects by interacting with the content web pages 116. Information is gathered by the media server 112 to formulate the customized XML 308 in step 408. This would include identification of the content objects stored on the audio and/or video database 108. The user information database 124 could be updated to reflect purchase of the content objects for a particular user 216. Customized XML is added to the download manager software 304 to form the download manager program 300-1. The authentication information 312 is added to the program 300-1. If compiling is required, it is also performed in step 412.

When clicking upon a link in a content web page, the user 216 chooses a path to save the download manager program 300 on their local computer hardware 204. Once received the program 300 may automatically or manually be executed by the user 216 in step 420. In step 424, the download manager program 300-1 is authenticated. Other embodiments could have controls such as passwords, download counting, and/or time limits that can be checked to prevent unauthorized downloading. Should authentication succeed along with any authorization testing, the content objects are downloaded in step 428 to any location that the user 216 chooses.

Figure 4B:
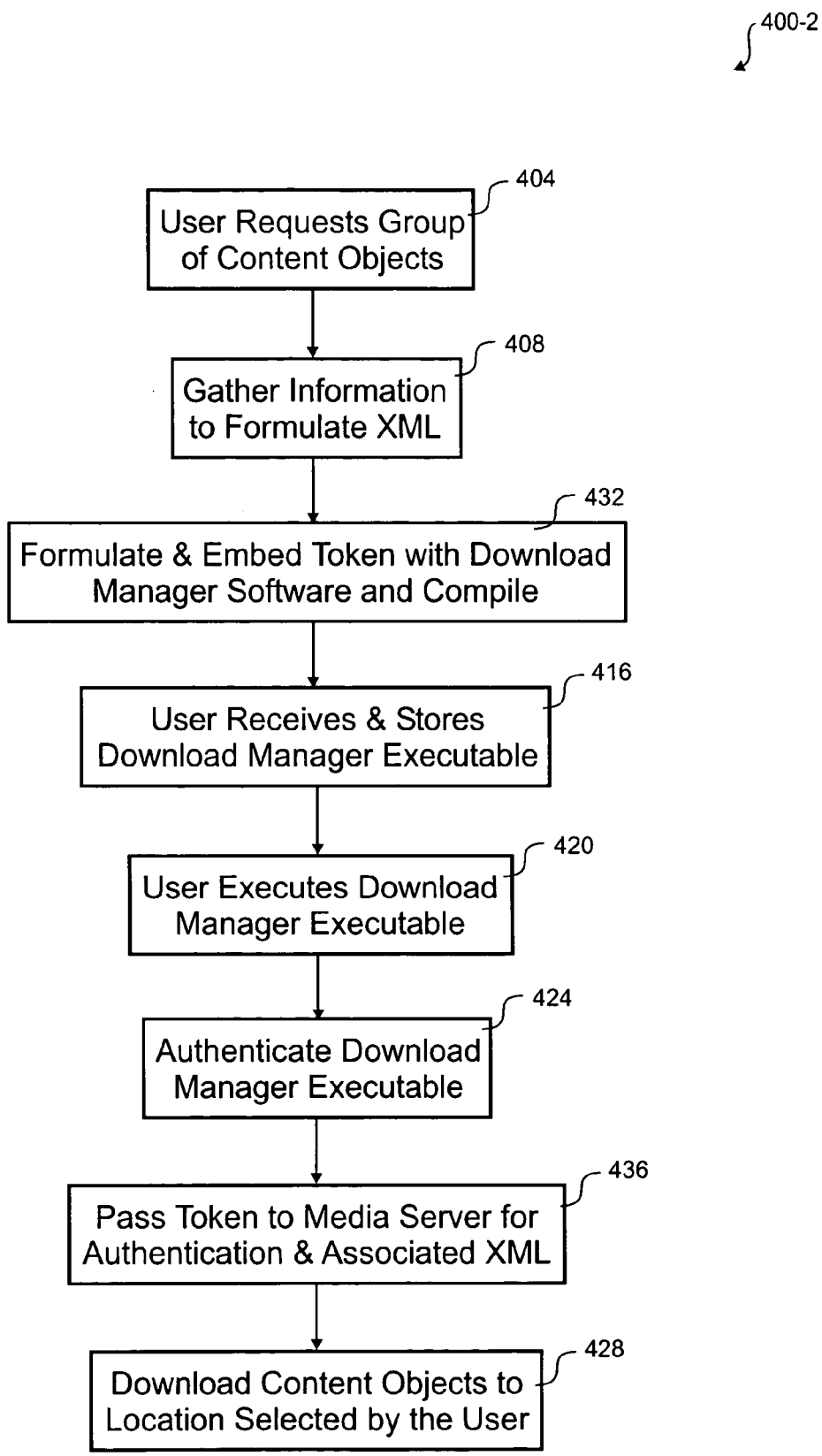

Referring next to FIG. 4B, a flow diagram of another embodiment of the process 400-2 for downloading multiple content files is shown that embeds the token 316 into the download manager program 300-2. This embodiment replaces step 412 with step 432 and inserts a new step 436 after step 424. In step 432, the token 316 is chosen and embedded into the download manager program 300-2. The XML is stored in the token database 220 and can be retrieved with the token 316. In step 436, the token 316 is pulled from the download manager program 300-2 and passed to the media site 102 for authentication of the token. The associated XML is pulled from the token database 220 and passed back to the user computer 104 for use by the download manager program 300-2 in requesting the content objects in step 428.

Figure 4C:
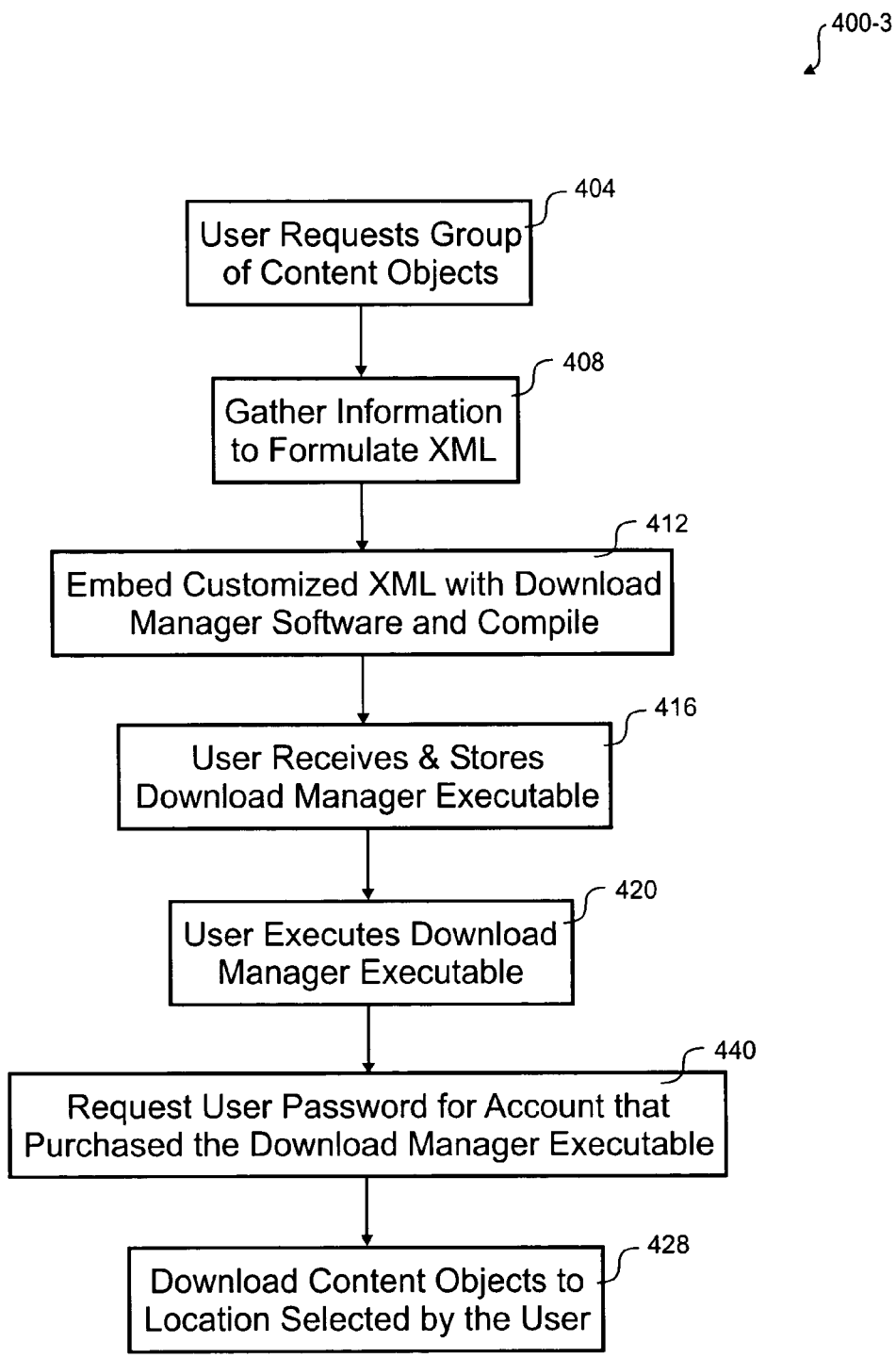

With reference to FIG. 4C, a flow diagram of yet another embodiment of the process 400-3 for downloading multiple content files is shown that uses password authentication of the download manager program 300. This embodiment differs from FIG. 4A in that step 424 is exchanged with step 440 to use password authentication of the user 216. Some embodiments could have both steps 424 and 440. In step 440, the download manager program 300 may check the password or the media site 102 may in other embodiments. The password could be stored in the customized XML 308 or could be stored in the user information database 124. If the password cannot be confirmed, the downloads are not allowed to proceed. In other embodiments, other authentication methods could be used to confirm the identity of the user 216, for example, biometric authentication could be used in some embodiments.

Figure 4D:
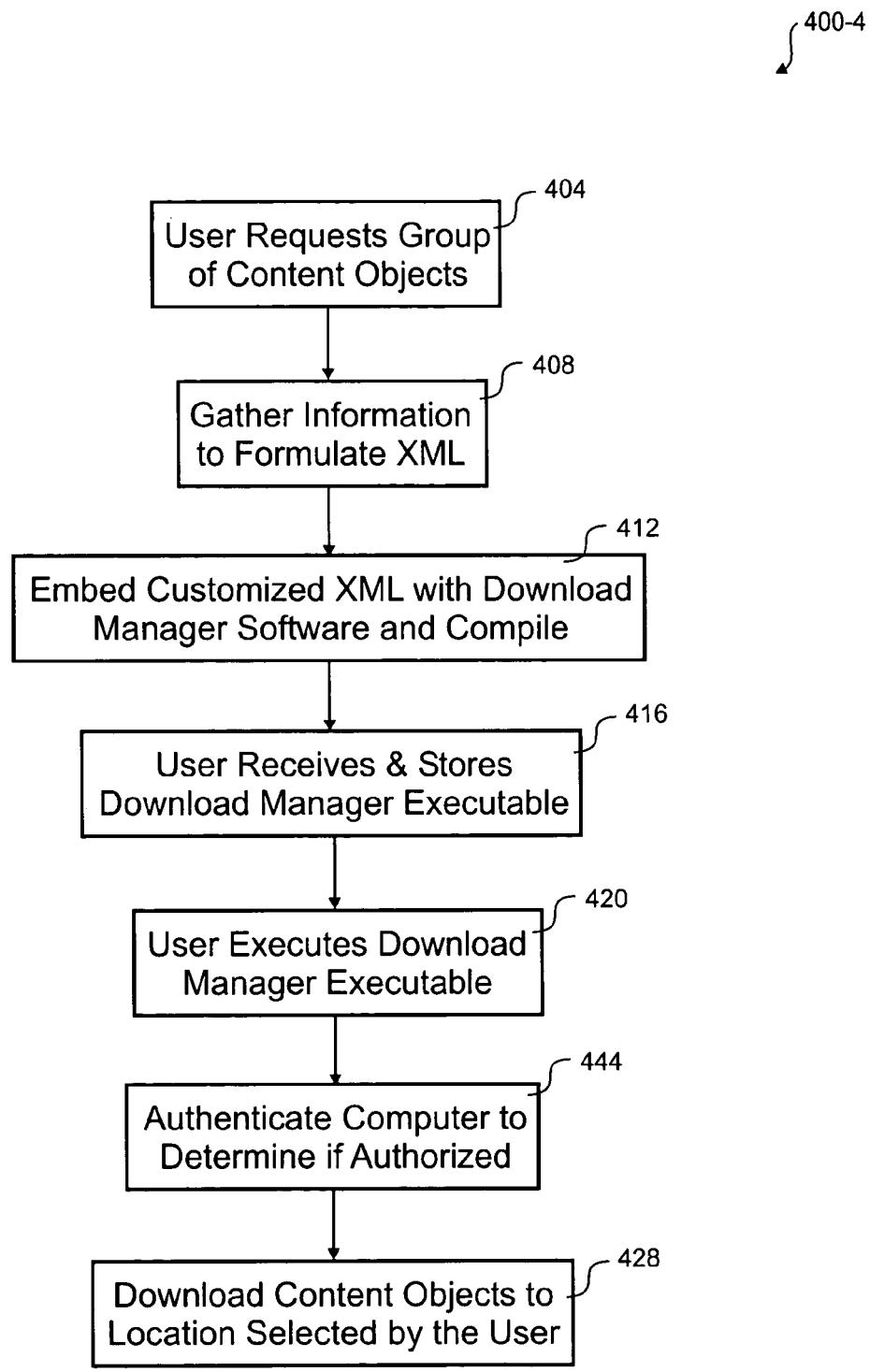

Referring next to FIG. 4D, a flow diagram of another embodiment of the process 400-4 for downloading multiple content files is shown that authenticates the computer before allowing a download of the content objects. This embodiment differs from the embodiment of FIG. 4A in that step 424 is exchanged with step 444. Some embodiments could include both steps 424 and step 444. In step 444, the computer 104 is authenticated by the download manager program 300 and/or the media site 102. The user computer 104 could have a unique serial number in the CPU, operating system and/or elsewhere. This embodiment could prevent downloads that are performed on too many different computers. In some embodiments, downloading to a new computer is only allowed after a time period. For example, only unlimited downloads to a single computer, but that computer can change once over two months. In another embodiment, three computers can download the content in any year long period, but the fourth computer would be denied access.

Figure 4E:
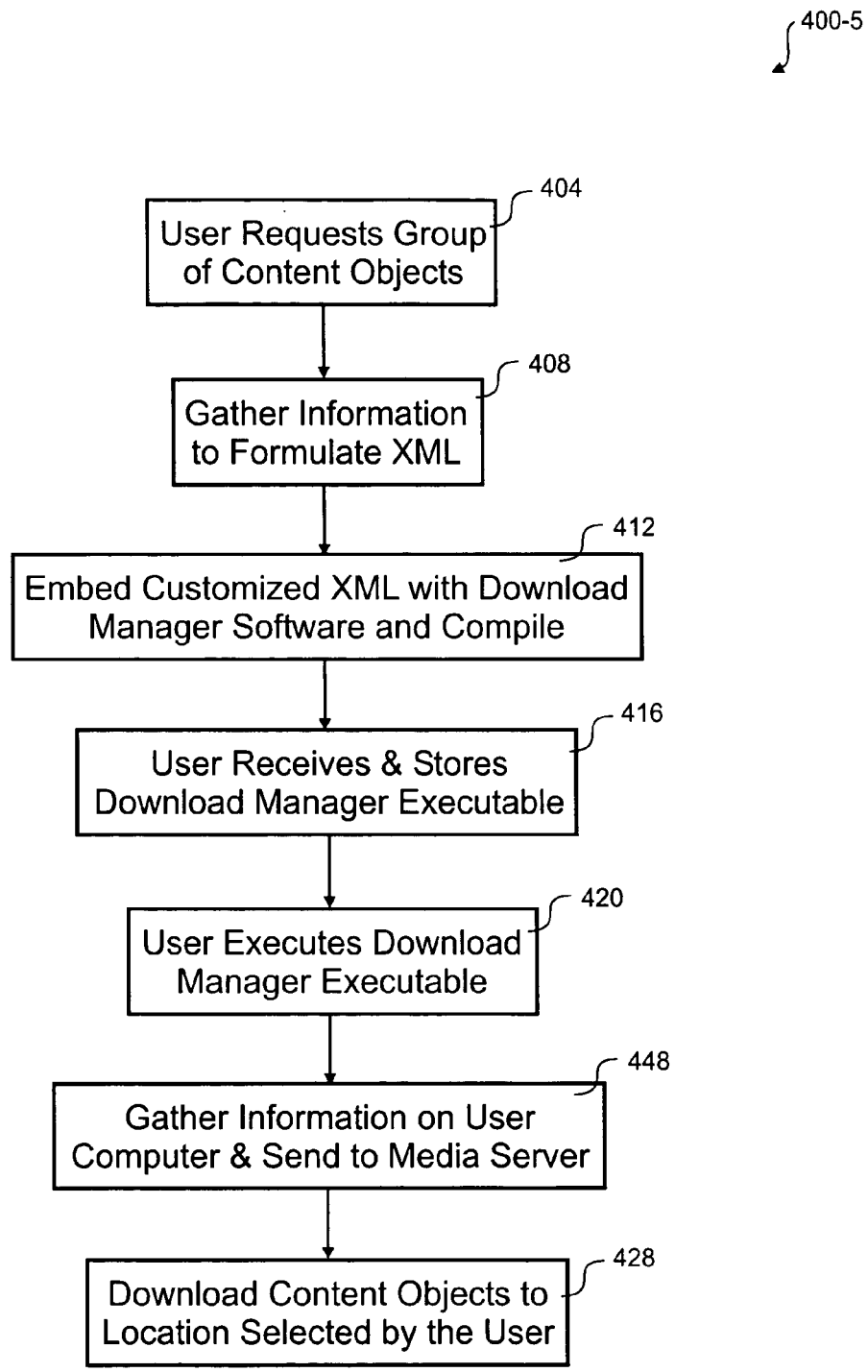

With reference to FIG. 4E, a flow diagram of yet another embodiment of the process 400-5 for downloading multiple content files is shown that gathers information on the user computer 104 before each download of the content objects. This embodiment differs from that of FIG. 4A in that step 424 is exchanged with step 448, but other embodiments could have both steps. In step 448, the download manager program 300 gathers information on the user computer 216 making the request. If too many different user computers 216 request the content objects, further downloads may be restricted. In some cases, the user account could be suspended. In one embodiment, a password is not initially required before downloads, but is required after excessive downloading. For example, the first three computers that download the content can do so without restriction, but the fourth computer would require a password of the user 216 stored in the user information database 124.

Figure 4F:
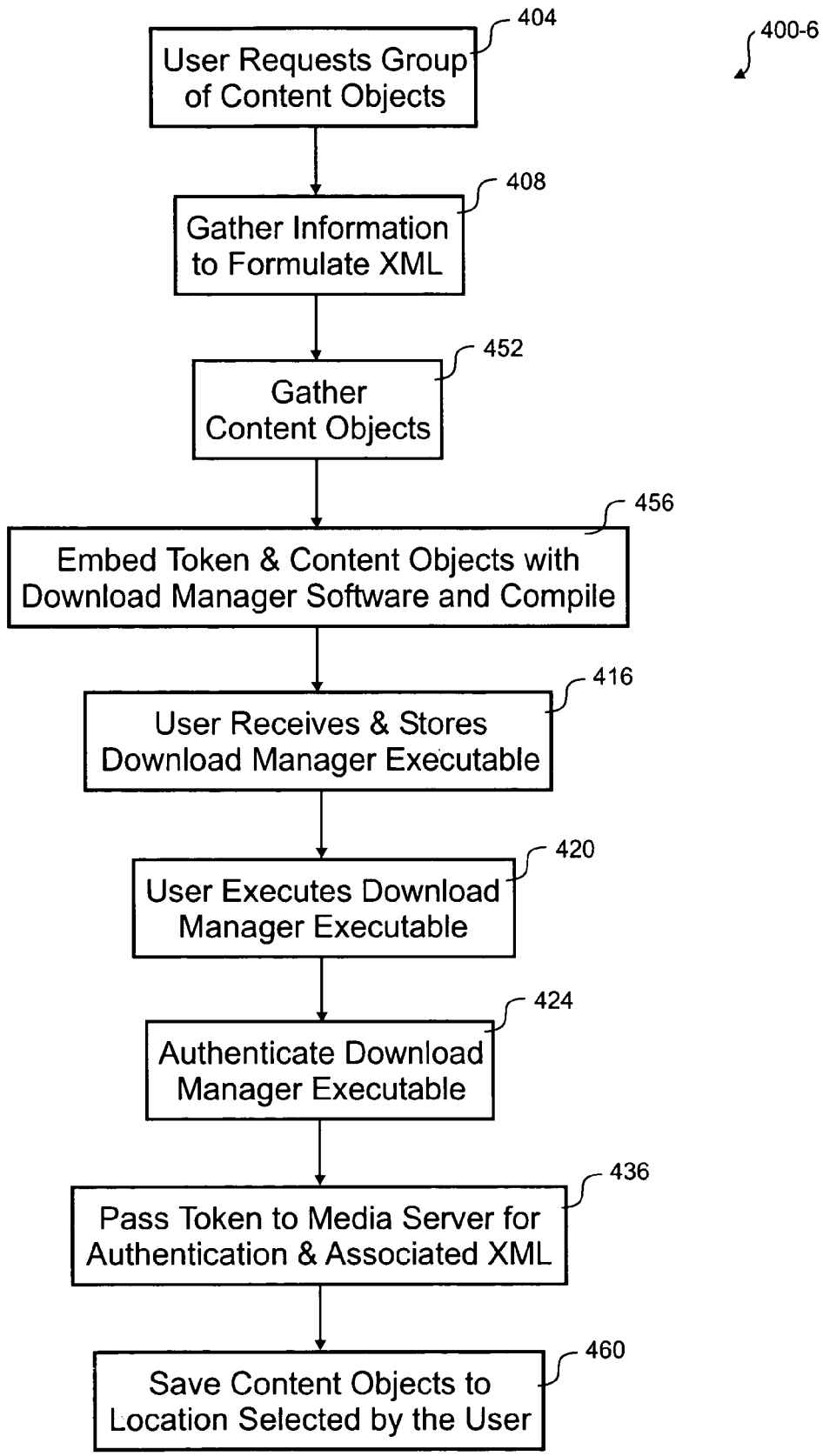

Referring next to FIG. 4F, a flow diagram of still another embodiment of the process 400-6 for downloading multiple content files is shown that embeds the content files into the download manager program 300-3. This embodiment differs from that of FIG. 4B in that step 432 is replaced with steps 452 and 456. Step 428 is replaced with step 460. The content objects are gathered in step 452 from the audio and/or video database 108. A token 316 is formulated for this particular program 300 downloaded. The download manager program 300 is formulated with the token and content objects. In step 460, the content objects are extracted from the download manager program 300 and stored in any location selected by the user 216.

While the principles of the invention have been described above in connection with specific apparatuses and methods, it is to be clearly understood that this description is made only by way of example and not as limitation on the scope of the invention.

What is claimed is:

1. A system for downloading a plurality of content objects from the Internet, the system comprising:
   a first web page for selecting the plurality of content objects;
   a second web page with a link to an application, wherein:
   the application correlates the plurality of content objects to the application,
   the application is configured to be user-executable, and
   the application is unique to each user;
   a database that stores the plurality of content objects;
   a media server that composes the application that includes embedded information, wherein:
   at least a portion of the embedded information comprises authentication information,
   the authentication information is unique to the application and correlates the application to:
   a user,
   a transaction session identifier,
   a computer of the user, and
   the plurality of content objects,
   the user downloads the application to a computer,
   the plurality of content objects are selected from the first webpage by the user using the computer of the user during a session associated with the transaction session identifier, and
   the media server:
   allows download of the plurality of content objects after:
   receiving the embedded information from the computer of the user,
   confirming that the authentication information unique to the application matches authentication information in the received embedded information, and
   confirming that the authentication information unique to the application correlates the application to the user, the transaction session identifier, the computer of the user and the plurality of content objects.

2. The system for downloading the plurality of content objects from the Internet as recited in claim 1, wherein the embedded information is transported over a network in encrypted format.

3. The system for downloading the plurality of content objects from the Internet as recited in claim 1, wherein the media server prevents download of the plurality of content objects if an attempt to authenticate at least one of the user, the computer, the embedded information, and the application should fail.

4. The system for downloading the plurality of content objects from the Internet as recited in claim 1, wherein the plurality of content objects are selected from the group consisting of audio files and video files.

5. The system for downloading the plurality of content objects from the Internet as recited in claim 1, wherein the media server allows download of the plurality of content objects on a plurality of occasions.

6. A method for enabling download of a plurality of objects from the Internet, the method comprising steps of:
    determining a plurality of objects associated with a transaction on a web site, wherein:
        a user orders the plurality of objects in the transaction, and
        the transaction is associated with a transaction session identifier;
    determining information to reference the plurality of objects;
    generating an user-executable application wherein:
        the user-executable application is unique to each user,
        the user-executable application includes the information that references the plurality of objects, and
        the user-executable application further includes authentication information, wherein the authentication information:
            is unique to the executable user-application and
            correlates the user-executable application to the user, the transaction session identifier and the plurality of objects; and
    sending the user-executable application to the user associated with the transaction, wherein activation of the user-executable application:
        sends the authentication information to a media server, and
        initiates download of at least some of the plurality of objects upon the media server verifying that the authentication information:
            sent to the media server matches the authentication information unique to the user-executable application, and
            correlates the user-executable application to the user, the transaction session identifier and the plurality of objects.

7. The method for enabling download of the plurality of objects from the Internet as recited in claim 6, wherein the plurality of objects are selected from the group consisting of audio files and video files.

8. The method for enabling download of the plurality of objects from the Internet as recited in claim 6, wherein the information is encrypted within the user-executable application.

9. The method for enabling download of the plurality of objects from the Internet as recited in claim 6, further comprising steps of:
    receiving the authentication information after the sending step; and
    sending the plurality of objects to the user.

10. The method for enabling download of the plurality of objects from the Internet as recited in claim 6, further comprising an authorizing step that determines if the user is allowed to download the plurality of objects, wherein the sending step is not performed if the authorizing step fails.

11. The method for enabling download of the plurality of objects from the Internet as recited in claim 6, further comprising a step of determining if the user exceeds one of the following thresholds and preventing the sending step if any threshold is exceeded:
    exceeding a total number of downloads of the plurality of objects;
    exceeding a periodic limit on downloads of the plurality of objects; and
    exceeding a number of computers the plurality of objects are downloaded to.

12. The method for enabling download of the plurality of objects from the Internet as recited in claim 6, further comprising steps of:
    receiving the authentication information after the sending step a first time;
    sending the plurality of objects to the user in response to the immediately-preceding receiving step;
    receiving the authentication information after the sending step a second time; and
    sending the plurality of objects to the user in response to the immediately-preceding receiving step.

13. A non-transient computer-readable storage medium having computer-executable instructions for performing the computer-implementable method for enabling download of the plurality of objects from the Internet of claim 6.

14. A computer system configured to perform the computer-implementable method for enabling download of the plurality of objects from the Internet of claim 6, wherein the computer system comprises the media server where the authentication information is sent.

15. A method for downloading of a plurality of objects from a network, the method comprising steps of:
    running an executable application received from a remote web site, wherein:
        the executable application is unique to a user, and
        the executable application is executable upon activation by the user;
    extracting information embedded within the executable application that references a plurality of objects selected by the user in a transaction on the remote web site, wherein the transaction is associated with a transaction session identifier; extracting authentication information, wherein the authentication information is unique to the executable application and correlates the executable application to the user, the transaction session identifier, a computer of the user, and the plurality of objects;
    sending the extracted authentication information to the remote web site; and
    receiving the plurality of objects after the remote website verifies that the authentication information sent to the remote website:
        matches the authentication information unique to the executable application, and
        correlates the executable application to the user and the plurality of objects.

16. The method for downloading of the plurality of objects from the network as recited in claim 15, wherein the network includes the Internet.

17. The method for downloading of the plurality of objects from the network as recited in claim 15, wherein the executable application includes a code that is used to determine tampering with the executable application.

18. A non-transient computer-readable storage medium having computer-executable instructions for performing the computer-implementable method for enabling downloading of the plurality of objects from the network of claim 15.

19. A computer system configured to perform the computer-implementable method for downloading of the plurality of objects from the network of claim 15, wherein the computer system comprises a server hosting the remote website.

* * * * *